United States Patent [19]

Anderson

[11] 4,108,262
[45] Aug. 22, 1978

[54] VEHICLE LOAD COUNT-DOWN SYSTEM

[76] Inventor: Joe H. Anderson, Rte. 1, Box 78, Dexter, Oreg. 97401

[21] Appl. No.: 769,026

[22] Filed: Feb. 16, 1977

[51] Int. Cl.² ............................................. G01D 19/08
[52] U.S. Cl. .................................... 177/136; 177/164; 340/52 R
[58] Field of Search ................. 177/136, DIG. 3, 173, 177/164, 25, 15; 340/52 R; 235/92 WT

[56] References Cited

U.S. PATENT DOCUMENTS

| 3,254,728 | 6/1966 | Aquadro | 177/15 |
| 3,531,766 | 9/1970 | Henzel | 177/136 X |
| 4,020,911 | 5/1977 | English | 177/136 |

*Primary Examiner*—Joseph W. Hartary
*Attorney, Agent, or Firm*—Kolisch, Hartwell, Dickinson & Stuart

[57] ABSTRACT

A load-monitoring system in a vehicle, which system enables a person located remote from the vehicle, such as the person performing a loading operation, to follow and be aware of the decreasing load-carrying capacity of the vehicle as added load thereon approaches maximum allowable load.

10 Claims, 4 Drawing Figures

U.S. Patent   Aug. 22, 1978   4,108,262
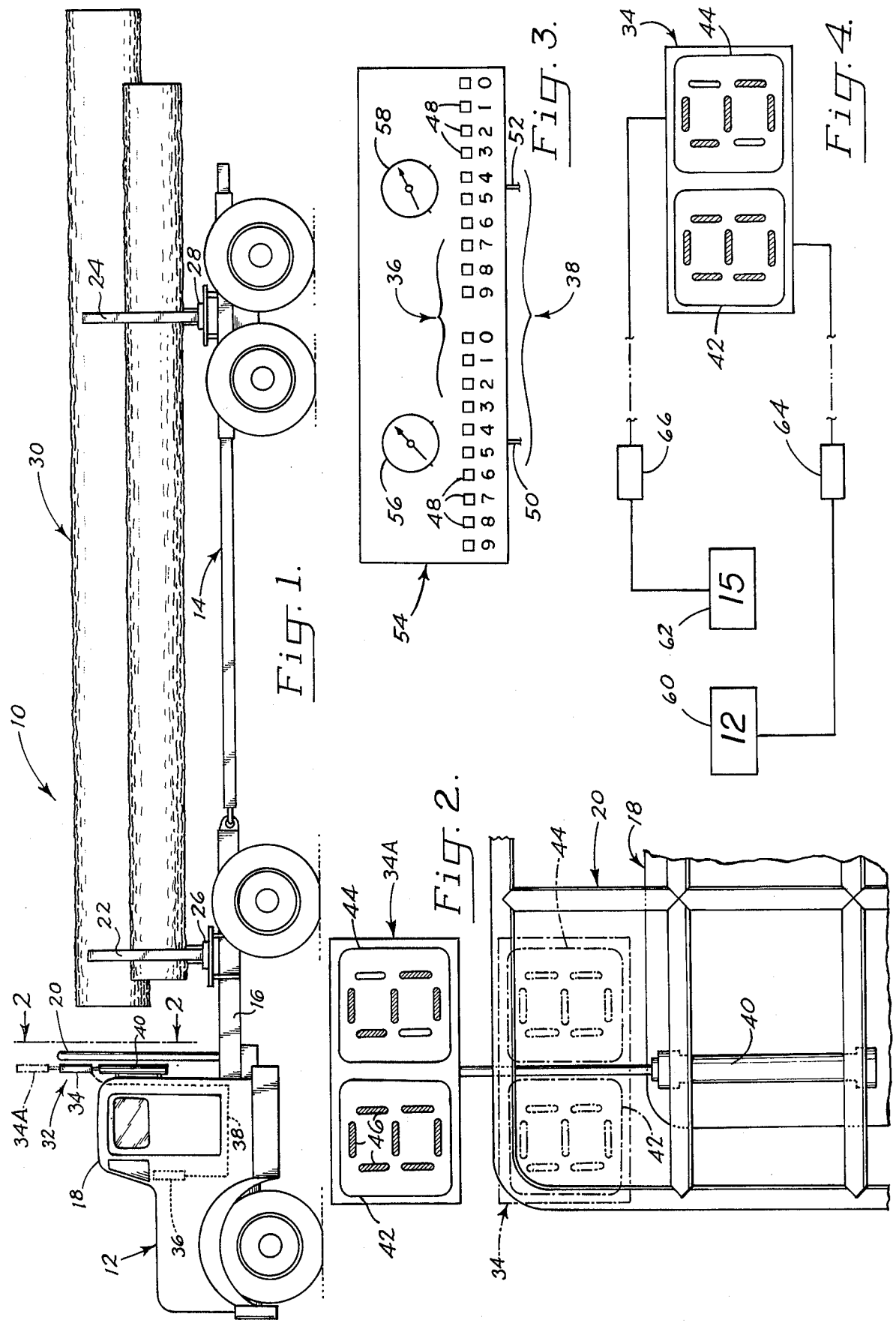

VEHICLE LOAD COUNT-DOWN SYSTEM

BACKGROUND AND SUMMARY OF THE INVENTION

This invention pertains to a load-monitoring system in a vehicle, and more particularly to such a system which allows a person remote from the vehicle to follow and be aware of the decreasing load-carrying capacity of the vehicle as added load thereon approaches maximum allowable load.

Loading of a vehicle such as a log tractor and trailer can be dangerous. For example, and with reference to such a vehicle, until the loaded logs are bound by chains in the usual log-supporting bunks, there is the continual danger that one or more logs may topple and cause injury and/or damage.

It is typical in modern vehicles of the type indicated to incorporate, in the load-support means, some sort of on-board load-measuring system which produces a readable indication, as for example, in a meter or digital indicator, in the vehicle cab, of the amount of actual load at different points on the vehicle. This is to inform the operator as the load reaches maximum load, and so as to avoid highway penalties for overloads. Typically, and during a loading operation, such as the loading of logs, the operator sits in the cab of the vehicle watching the load-indicating apparatus, and when load approaches maximum load, he steps out of the cab, and often approaches the loading operator, to indicate load status. This is the point in time where risk to the operator, as he steps out alongside the yet unbound load, is extremely high. A number of serious accidents, including deaths, have resulted from a load toppling onto an operator at this time.

A general object of the present invention is to provide a load count-down system which may be operated, either manually by a vehicle operator from within the vehicle, or automatically in response to the load-measuring system in the vehicle, to indicate clearly to the remote loading operator vehicle load status.

Another object of the invention is to provide such a system which is simple in construction, simple in operation, and easily incorporated in a wide variety of existing vehicles.

According to a preferred embodiment of the invention, what is proposed is a digital indicating means mountable, for example, on the back side of a cab in a vehicle, and elevatable to different selected heights so as to be visible above the top of any expected load. In one embodiment of the invention this indicating means is operated through manually controlled mechanism within the vehicle cab to indicate the still-available load carrying capacity of the vehicle, in a preselected range immediately below the maximum allowed load for the vehicle. In another embodiment of the invention, an automatic system is contemplated, wherein the load-indicating means is under the direct non-manual control of the on-board load-measuring system in the vehicle.

With the proposed system, it is under no circumstances necessary for an operator to stand anywhere near alongside a partially loaded vehicle, since it is not necessary for him directly to signal the loading operator of load status. In the first-mentioned embodiment, the vehicle operator remains in the cab controlling the indication of the outwardly visible load-indicating means. In the second-mentioned embodiment of the invention, where automatic control is contemplated, the vehicle operator may either be in the cab or at some point outside the cab and outside the field of danger.

These and other objects and advantages which are attained by the invention will become more fully apparent as the description which now follows is read in conjunction with the accompanying drawings.

DESCRIPTION OF DRAWINGS

FIG. 1 is a simplified side elevation of a log truck incorporating a load count-down system constructed in accordance with the present invention.

FIG. 2 is an enlarged fragmentary view taken generally along the line 2—2 in FIG. 1, illustrating an outwardly visible load-indicating means forming part of the system of the invention, and illustrated in two different positions which it may occupy.

FIG. 3 is a fragmentary simplified view illustrating a manual control for the indicating means of FIG. 2, mounted in the cab of the log truck, and used in response to operation of the usual on-board load-measuring system provided in the truck.

FIG. 4 is a simplified view illustrating another modification of the invention wherein automatic control is provided.

DETAILED DESCRIPTION OF THE INVENTION

Turning now to the drawings, and referring first to FIG. 1, indicated generally at 10 is a log truck including the usual power-driven tractor 12 and trailer 14. Tractor 12 includes a conventional frame 16 which carries the usual vehicle cab 18 for an operator, behind which cab, and mounted on frame 16, there is the usual cab protection framework 20.

Mounted in the usual fashion on frame 16 is a log bunk 22, and also mounted in the usual fashion on trailer 14 is another log bunk 24. Bunks 22, 24 are supported through a conventional on-board load-measuring system including load sensors 26, 28 for bunks 22, 24, respectively. Sensor 26 senses all of the load carried by bunk 22, and sensor 28 performs in a similar manner with respect to bunk 24. Indicated generally at 30 is a partial load of logs carried by the bunks.

Incorporated with truck 10, and more specifically mounted on tractor 12, is a load count-down system 32 which is constructed in accordance with the present invention, and which works in cooperation with the load-measuring system that includes sensors 26, 28. In general terms, system 32 includes an external indicator 34, also referred to as a second load-indicating means, and an internal actuator 36, mounted within cab 18 for operating indicator 34. Indicator 34 and actuator 36 are electrical devices herein, and are operatively interconnected by a cable represented by dashed line 38, also referred to as interconnecting means. Indicator 34 is mounted on the rear of cab 18, just in front of framework 20, on a pneumatic ram 40 which is operable to raise and lower the indicator, thus to place it at a suitable height for viewing over the top of any load on the truck. Indicator 34 is shown in solid outline in FIG. 1 in its fully lowered position, where it is in a protected position immediately in front of and adjacent framework 20, and is shown at 34A in dash-dot lines in a raised position above the framework.

Considering now FIGS. 2 and 3 along with FIG. 1, here indicator 34 is in dash-dot lines in its fully lowered position, and its previously mentioned raised position 34A in solid lines.

Indicator 34 herein takes the form of two side-by-side disposed conventional electrically operated discreet digital indicating devices 42, 44. As will be explained, device 42 works in conjunction with sensor 26 with respect to additional load capacity for bunk 22, and device 44 works similarly with respect to sensor 28 regarding additional load capacity for bunk 24. As is well understood by those familiar with such digital indicating devices, each such device includes seven discreetly lightable areas, such as the two areas shown at 46 in device 42. Different ones of these areas are lighted to indicate different digits. In FIG. 2, and as indicated by heavy cross-hatching in these areas in devices 42, 44, device 42 presents the number 8, and device 44 the number 5. The significance of these numbers will be explained shortly.

Turning attention for a moment particularly to FIG. 3, according to one embodiment of the invention, actuator 36 takes the form of sets of button-controlled electrical switches, such as switches 48. In the particular system shown, actuator 36 includes two sets of such switches, with each set including ten switches — these being numbered 0–9, inclusive. These switches are referred to herein as selectively actuatable means. The switches making up the left hand set in FIG. 3 are wired in a known manner to the lightable areas in device 42 through conductors contained in a bundle indicated at 50. Similarly, the switches included in the right hand set in FIG. 3 are wired to the lightable areas in device 44 through conductors contained in a bundle indicated at 52 in FIG. 3. Bundles 50, 52 make up previously mentioned cable 38.

It is contemplated that the two sets of switches 48 are suitably mounted on a control box, such as box 54 shown in FIG. 3, which is suitably attached to the dashboard, or to any other suitable structure, provided within cab 18. Box 54 is also shown herein mounting a pair of load-indicating meters 56, 58. These meters are also referred to herein as first load-indicating means, with meter 56 being conventionally electrically connected with sensor 26 and meter 58 being similarly connected to sensor 28. Meters 56, 58 form part of the previously mentioned on-board load-measuring system.

Explaining now how the embodiment of the invention so far described is used, and explaining the particular significances of the indications shown in meters 56, 58 and in devices 42, 44 herein, when count-down system 32 is energized by closing of a suitable power switch, the vehicle operator may cause any one of ten different digits to be displayed in each of devices 42, 44, simply by pressing the appropriate switch button associated with the device. For example, device 42 is shown in FIG. 2 displaying digit 8, and such has resulted from pressing of the button marked 8 in the left set of switches 48 in FIG. 3. Similarly, display of digit 5 in device 44 has resulted from pressing of the switch button marked 5 in the right set of switches 48 in FIG. 3. When it is desired to change the digits displayed by a particular device, a different switch button is pushed in accordance with the desired new digit.

For purposes of illustration herein, it has been assumed that maximum allowable load is the same on each of the two log bunks — this load being 20,000 pounds. Also, it has been decided that in system 32 it is desired to be able to indicate to someone loading the truck when the still-available load carrying capacity of each bunk falls within the final range of 10,000 pounds. In other words, once the load on a bunk comes within 10,000 pounds of maximum permitted load, system 32 is operable to indicate to the loader how much additional capacity is available.

Considering specifically what is shown in FIGS. 2 and 3, with reference to the partial load 30 in FIG. 1 on the bunks, the position of the pointer in meter 56 is intended to indicate that the load on this bunk now stands at 12,000 pounds. Similarly, the position of the pointer in meter 58 is intended to indicate that the rear bunk 24 now has a load of 15,000 pounds. Accordingly, the additional load-carrying capacity of bunks 22, 24 is 8,000 and 5,000 pounds, respectively. Thus, as the vehicle operator, from within the cab, observes the positions of the pointers in meters 56, 58, and when these pointers fall within the final 10,000 pound load range available to the bunk, he simply operates the appropriate push-button switches to indicate additional available load-carrying capacity.

Further, and in accordance with the overall height of the load, the operator controls ram 40 so as to elevate indicator 34 sufficiently high that the loading personnel can read the indications presented thereby.

Thus, and assuming that indicator 34 is raised a sufficient amount, the loader can read from a distance how much additional load may be placed on the bunks, without the necessity of the vehicle operator having to expose himself to danger alongside the partial, unbound load.

FIG. 4 illustrates a modification of the system in which there is a direct interconnection between the on-board load-measuring system and the load count-down system of the invention. Here, indicating devices, such as digital indicators 60, 62, form part of the on-board system — these indicators being electrically operated devices. Device 60 is suitably electrically connected to a conventional pre-programmed calculating device 64 which is pre-programmed to produce a control signal indicative of the difference between the load on bunk 22 and 20,000 pounds, within the final 10,000 pound range. This control signal is fed in a conventional manner to the lightable areas in device 42 for the purpose of controlling which of these areas light up. A similar arrangement, including a calculating device 66, is provided intermediate indicator 62 and device 44 with respect to additional load-carrying capacity for bunk 24. Those skilled in the art will recognize there are a wide variety of electrical circuits which may be used for the purpose just described, and details of these circuits form no part of the present invention, and accordingly are not discussed.

It will thus be apparent that a load count-down system is provided in accordance with the invention which offers all of the advantages ascribed to it earlier. For example, it is evident that the proposed system is extremely simple in construction, and readily incorporable in a wide variety of vehicles without requiring any significant modification of such vehicles. The safety contribution offered by the invention is believed to be obvious. With a vehicle using the proposed system, no longer is there a need for a vehicle operator to expose himself alongside a partial, unbound load, simply for the purpose of informing the loading personnel as to additional load capacity. In one form of the invention the operator remains in the vehicle cab manually controlling the operation of the system. In another form of the invention, the system responds automatically to the condition of the usual on-board load-measuring apparatus.

While two different modifications of the proposed count-down system have been shown and described herein, it is appreciated that variations and modifications, with respect to details of construction, may be made, and are possible without departing from the spirit of the invention.

What is claimed is:

1. A count-down load-monitoring system for a load-carrying vehicle of the type including on-board load-monitoring apparatus, which vehicle is required to carry no more than a certain maximum load, said system in operative condition in a vehicle comprising count-down load-indicating means mounted on the vehicle for viewing from a distance away from the vehicle, operable to indicate a decreasing, additional load-carrying capacity for the vehicle within a selected range extending below said certain maximum load as load is added to the vehicle, and informing means for said load-indicating means operatively interposed between the latter and said on-board load-monitoring apparatus and located adjacent the operator's station, operable to cause said load-indicating means, with the additional load-carrying capacity of the vehicle falling within said selected range, to produce a remotely viewable indication reflective of remaining additional load-carrying capacity of the vehicle.

2. The system of claim 1, wherein said informing means comprises means selectively actuatable by an operator within the operator's station.

3. The system of claim 1, wherein said informing means comprises means responsive automatically to the performance of said on-board load-monitoring apparatus.

4. Vehicle load-monitoring apparatus in operative condition in a vehicle comprising means incorporated in the vehicle for following the load carried thereby, first load-indicating means operatively connected to said following means for indicating the amount of load carried at any given time by the vehicle as noted by the following means, said first load-indicating means being mounted within the operator's station in the vehicle for viewing therein by an operator, second load-indicating means mounted on the vehicle for viewing from locations remote from the vehicle by someone outside the vehicle, operable within a selected range to indicate a decrease in the load-carrying capacity of the vehicle as load is added to the vehicle, and informing means operatively connected to said second load-indicating means and disposed adjacent the operator's station for enabling from adjacent such station informing of the second load-indicating means of the vehicle's load carrying capacity within the said selected range in accordance with the load indication produced at any given time by said first load-indicating means.

5. The apparatus of claim 4, wherein said second load-indicating means is constructed to provide indications in preselected increments within said selected range.

6. The apparatus of claim 4, wherein said informing means comprises means selectively actuatable by an operator within the operator's station.

7. The apparatus of claim 4, wherein said informing means includes means operatively interconnecting said first and second load-indicating means.

8. A count-down load-monitoring system for a load-carrying vehicle which is required to carry no more than a certain maximum load, said system in operative condition in a vehicle comprising on-board load-measuring means incorporated in the vehicle for measuring the load supported at any given time by the vehicle, first load-indicating means mounted on the vehicle for viewing within the operator's station therein, operatively connected to said load-measuring means and operable to indicate the load measured at any given time by the load-measuring means, second load-indicating means mounted on the vehicle for viewing from a distance away from the vehicle, operable to indicate a decreasing, additional load-carrying capacity for the vehicle within a selected range extending below said certain maximum load as load is added to the vehicle, and informing means for said second load-indicating means operatively connected thereto and located adjacent the operator's station, operable to cause said second load-indicating means, with the additional load-carrying capacity of the vehicle falling within said selected range, to produce a remotely viewable indication reflective of remaining additional load-carrying capacity of the vehicle.

9. The system of claim 8, wherein said informing means comprises means selectively actuatable by an operator within the operator's station.

10. The system of claim 8, wherein said informing means comprises means operatively inter-connecting said first and second load-indicating means.

* * * * *